US010673170B2

(12) United States Patent
Hopfen

(10) Patent No.: US 10,673,170 B2
(45) Date of Patent: Jun. 2, 2020

(54) LID ARRANGEMENT

(71) Applicant: Volvo Car Corporation, Göteborg (SE)

(72) Inventor: Artur Hopfen, Göteborg (SE)

(73) Assignee: Volvo Car Corporation, Göteborg (SE)

( * ) Notice: Subject to any disclaimer, the term of this patent is extended or adjusted under 35 U.S.C. 154(b) by 0 days.

(21) Appl. No.: 16/361,297

(22) Filed: Mar. 22, 2019

(65) Prior Publication Data

US 2019/0312376 A1 Oct. 10, 2019

(30) Foreign Application Priority Data

Apr. 10, 2018 (EP) .................................. 18166506

(51) Int. Cl.
*H01R 13/453* (2006.01)
*B60R 16/03* (2006.01)
(Continued)

(52) U.S. Cl.
CPC ........... *H01R 13/4536* (2013.01); *B60R 7/04* (2013.01); *B60R 16/03* (2013.01);
(Continued)

(58) Field of Classification Search
CPC ............... H01R 13/44; H01R 13/4538; H01R 13/7036; H01R 13/447; H01R 13/4532; H01R 13/4534
(Continued)

(56) References Cited

U.S. PATENT DOCUMENTS 6,028,267 A * 2/2000 Byrne .................. H01R 13/518
174/55
6,979,209 B2 * 12/2005 Griepentrog ......... H01R 13/447
439/131
(Continued)

FOREIGN PATENT DOCUMENTS

DE 102012014384 A1 1/2014
DE 102014012010 A1 3/2015
(Continued)

OTHER PUBLICATIONS

Jun. 13, 2018 European Search Report issue on International Application No. EP18166506.

*Primary Examiner* — Hien D Vu
(74) *Attorney, Agent, or Firm* — Clements Bernard Walker; Christopher L. Bernard

(57) ABSTRACT

A lid arrangement including a lid and a surrounding panel. The lid includes a top wall facing outwards and one or more wall of a side wall and/or an end wall. The lid is transitable from a closed position to an open position via an intermediate position, the lid in the open position allowing access to the one or more wall of the side wall and/or the end wall. One of the lid and the surrounding panel includes a pivot axis and the other includes a slot configured to receive the pivot axis. The slot is configured for translational displacement of the pivot axis within the slot, allowing the lid to transit from the closed position to the intermediate position, and for pivotal displacement of the pivot axis within the slot, allowing the lid to transit from the intermediate position to the open position.

14 Claims, 5 Drawing Sheets

(51) Int. Cl.
*H01R 13/52* (2006.01)
*B60R 7/04* (2006.01)

(52) U.S. Cl.
CPC . *H01R 13/5213* (2013.01); *G06F 2213/0042* (2013.01); *H01R 2201/26* (2013.01)

(58) Field of Classification Search
USPC .................................................. 439/131, 138
See application file for complete search history.

(56) References Cited

U.S. PATENT DOCUMENTS

| | | | | |
|---|---|---|---|---|
| 7,125,063 | B2* | 10/2006 | Kawamoto | B60N 2/793 |
| | | | | 296/37.8 |
| 8,011,704 | B2* | 9/2011 | Nees | B60R 19/48 |
| | | | | 293/106 |
| 9,257,799 | B2* | 2/2016 | Stubbs | H01R 13/73 |
| 2003/0127877 | A1* | 7/2003 | Luginbill | B60N 3/10 |
| | | | | 296/37.8 |
| 2005/0248170 | A1 | 11/2005 | Kawamoto et al. | |
| 2014/0361567 | A1 | 12/2014 | Singh | |

FOREIGN PATENT DOCUMENTS

| | | |
|---|---|---|
| DE | 102016102736 A1 | 8/2017 |
| GB | 2445741 A | 7/2008 |

\* cited by examiner

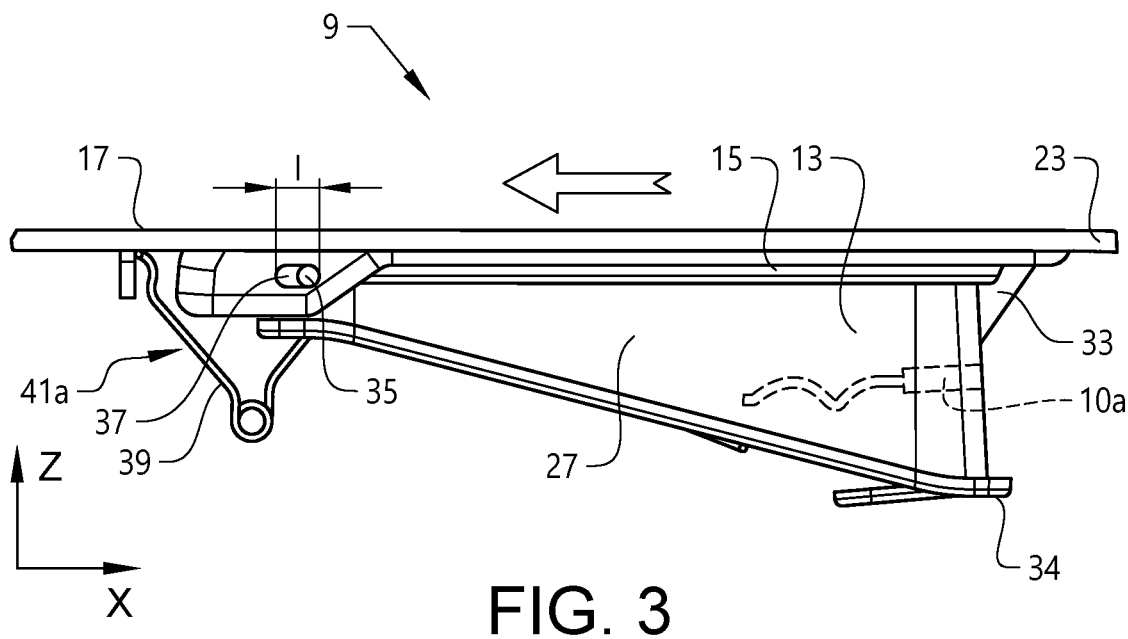
FIG. 3
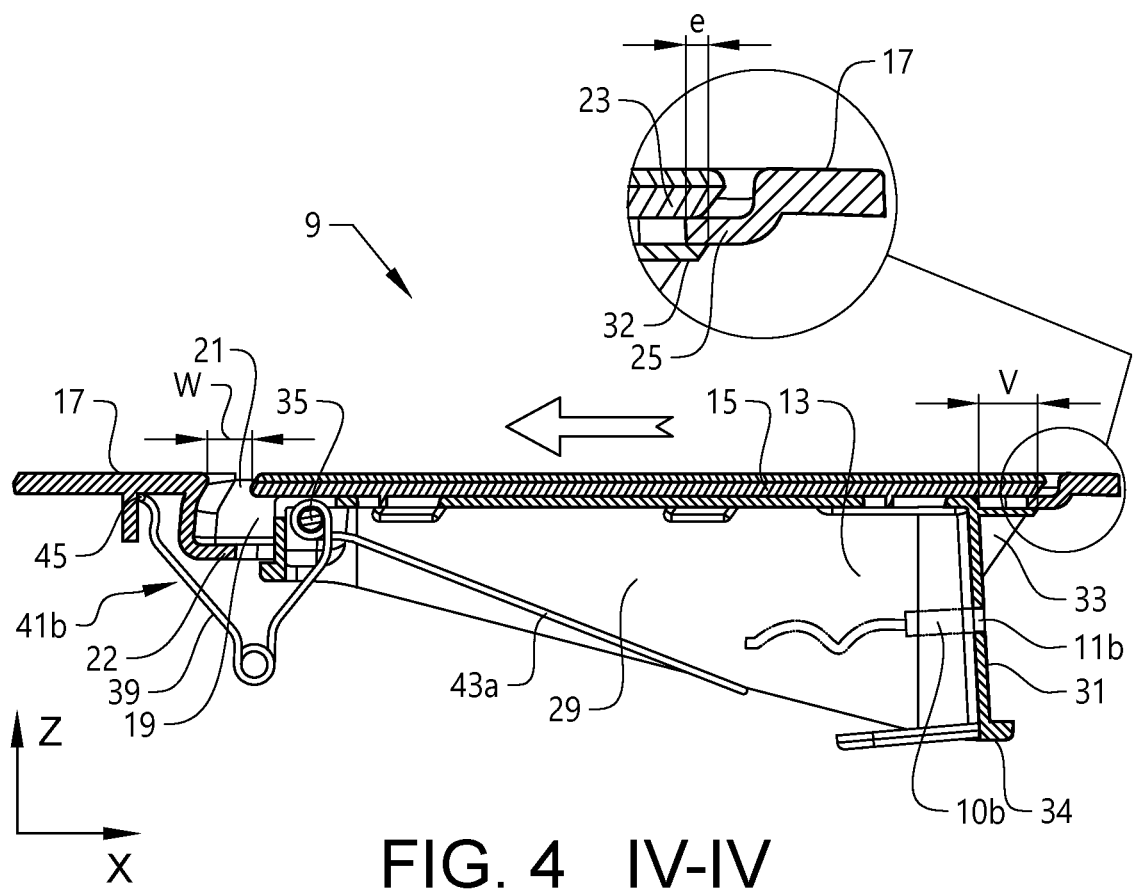
FIG. 4  IV-IV

LID ARRANGEMENT

CROSS-REFERENCE TO RELATED APPLICATION

The present disclosure claims the benefit of priority of co-pending European Patent Application No. 18166506.8, filed on Apr. 10, 2018, and entitled "LID ARRANGEMENT," the contents of which are incorporated in full by reference herein.

TECHNICAL FIELD

The present disclosure relates to a lid arrangement including a lid and a surrounding panel, which may be a vehicle panel. The lid arrangement may further include a connector of an electronic device, e.g. a USB connector, the connector being located inside the lid. The present disclosure further relates to a vehicle including such a lid arrangement.

BACKGROUND

Nowadays, it is quite common to use a portable electronic device, such as a mobile phone, a smartphone, a computer tablet or a portable computer, in a vehicle. Sometimes, it is desirable to be able to connect the electronic device to the vehicle, e.g. in order to load a battery of the electronic device and/or to connect the electronic device to an infotainment system or another system of the vehicle. Such a connector may be e.g. a USB connector, wherein USB is an abbreviation for Universal Serial Bus.

Patent document DE 10 2016 102 736 discloses a storage compartment in a centre console of a vehicle. A charging device is provided in a rotatable cover element. The cover element is configured to be able to hold an electronic device, such as a smart-phone, which may be connected to the charging device. Hence, the electronic device is inside the cover element when being charged.

In general, it is desirable to provide a solution for the lid arrangement, which can protect the connector when not in use and which can allow easy access to the connector when in use.

It is desirable to provide a space-efficient solution for the lid arrangement.

SUMMARY

The object of the present disclosure is to overcome or ameliorate at least one of the disadvantages of the prior art, or to provide a useful alternative.

The present invention relates to a lid arrangement including a lid and a surrounding panel. The surrounding panel includes a lid opening, in which the lid is located. The lid includes a top wall facing outwards and one or more wall of a side wall and/or an end wall. The lid is transitable from a closed position to an open position in relation to the surrounding panel, wherein the top wall of the lid in the closed position is configured to at least partly cover the lid opening, and wherein the lid in the open position allows access to one or more wall of the side wall and/or the end wall. The lid is transitable from the closed position to the open position in relation to the surrounding panel via an intermediate position. One of the lid and the surrounding panel includes a pivot axis and the other of the lid and the surrounding panel includes a slot configured to receive the pivot axis. The slot is configured for translational displacement of the pivot axis within the slot, allowing the lid to transit from the closed position to the intermediate position. The slot is also configured for pivotal displacement of the pivot axis within the slot, allowing the lid to transit from the intermediate position to the open position.

The lid arrangement may be located in a passenger compartment of a vehicle, as is further described below. Hence the surrounding panel may be a vehicle panel. The lid typically has a square or rectangular shape, although other geometrical shapes would be feasible.

The lid opening is determined in a plane, which is flush with the surface of the surrounding panel. If the surrounding panel has a curved surface, an average plane is determined for the curved surface and the lid opening is assumed to be flush with that average plane. Preferably, the surrounding panel completely surrounds the lid, such that the lid opening has a closed perimeter.

The lid includes a top wall facing outwards. Further, the lid may include an end wall, which typically is perpendicular or substantially perpendicular to the outwards-facing surface of the top wall. If the outwards-facing surface of the top wall is curved, an average surface is determined. Hence, if the top wall is substantially horizontal, the end wall is substantially vertical. There may be two end walls, one at each end of the top lid, but typically there is only one end wall, located at the end most spaced away from the pivot axis.

As an alternative or a complement to the end wall, the lid may include one or more side walls. Typically, there are two side walls, one at each lateral side of the lid. The side wall is perpendicular or substantially perpendicular to the outwards-facing surface of the top wall and also perpendicular or substantially perpendicular to the optional end wall. Hence, if the top wall is substantially horizontal, the side wall is substantially vertical, but perpendicular to the also vertical end wall. If there are two side walls, they may typically be parallel to each other.

In the closed position of the lid, the top wall at least partly covers the lid opening, preferably substantially covers the lid opening. However, an interspace may be formed, as is further described below.

In the open position, the lid allows access to one or more wall of the side wall and/or the end wall. Typically, there is at least access to the end wall located most spaced away from the pivot axis.

During the transition from the closed position to the open position in relation to the surrounding panel, the lid passes via an intermediate position. There may be one or more intermediate positions. In the intermediate position/s, the lid is free to pivot in relation to the surrounding panel in order to reach the open position, i.e. the lid is rotated from the intermediate position to the open position by means of the pivot axis, thereby rotating in relation to the slot. The displacement from the closed position to the open position may be performed by a hand of the user of the vehicle.

Typically, the lid is displaced from the closed position to the intermediate position by the pivot axis sliding or rolling in the slot. The pivot axis may thereby move from a first end of the slot corresponding to the closed position, to the other end of the slot corresponding to the intermediate position. As an alternative, the slot may be longer than the displacement between the closed position and the intermediate position, such that the pivot axis only moves within a part of the slot.

Hence the displacement from the closed position to the open position combines a translational displacement in the slot, typically a linear translation, with a pivotal displacement, i.e. the rotation to the open position. Preferably, the translational displacement is followed by the pivotal displacement, but they may also be carried out at least partly in parallel during the last part of the translational displacement.

The lid is reversibly displaceable, such that it can be moved back from the open position to the closed position, which may be performed by passing the intermediate position/s. When the lid is to be closed again, the user of the vehicle may apply pressure to push the lid downwards at the same time as the pivot axis first rotates and then moves in the slot.

One of the lid and the surrounding panel includes a pivot axis and the other of the lid and the surrounding panel includes a slot configured to receive the pivot axis. The pivot axis may be a through-going shaft, e.g. passing through the side walls of the lid. There may also be two short pivot axes, e.g. one at each side wall of the lid. As yet an alter-native embodiment, the pivot axis/axes could instead be located in the surrounding panel and the slot could instead be included in the lid, e.g. at a side wall or both side walls thereof.

With the lid arrangement as described herein, it is possible to connect to the electronic device, while the electronic device is outside the lid. This differs from the solution of the above-mentioned patent document DE 10 2016 102 736, wherein the electronic device is inside the cover element when being charged. Thereby, the lid itself and also the lid arrangement can be made much smaller than the cover element of DE 10 2016 102 736.

In addition, by utilizing the lid arrangement as disclosed herein, it is possible to have a very space-efficient solution, since no extra button or lever is required to open the lid. According to prior art, such a button or level may be located in the lid or in the surrounding panel.

Moreover, with the lid arrangement as described herein, the one or more wall of the side wall and/or the end wall, which may include the connector for the electronic device, is easily accessible in the open position of the lid and yet well protected in the closed position of the lid. This differs from the solution of the above-mentioned patent document DE 10 2016 102 736, wherein the connector is exposed when the cover element is open also when the connector is not in use, e.g. when the cover element is opened to reach something else located in the storage compartment.

The one or more wall of the side wall and/or the end wall may include a connector aperture configured for a connector of an electronic device, such as a USB connector, the connector being at least partly located inside the lid. The connector aperture has a shape adapted to receive and/or hold the connector of the electronic device or to give easy access to the connector of the electronic device. Hence the size of the connector aperture is adapted to the size of the connector. With a lid arrangement according to the present invention, the connector will be protected by the closed lid, when not in use, since the connector will be located below the surrounding panel. Yet the connector is easily accessible for use, when the lid is in the open position. Typically, the connector aperture is located at the end wall located most spaced away from the pivot axis, but there may as an alternative or a complement, be one or more connector apertures located at the side wall/s as well.

The lid arrangement may include the connector of the electronic device, e.g. the USB connector, the connector being located at least partly inside the lid, such that the connector forms a built-in feature of the lid. Thereby, the electronics of the connector is protected by the end wall and side walls. The connection to the electronic device is made through the connector aperture.

As mentioned above, the lid arrangement as described herein is suitable for use in a vehicle. The top wall and/or the surrounding panel may be configured to form a surface part of a vehicle structure, such as a surface part of a storage compartment, a centre console, a dashboard, a door, a ceiling or a compartment wall of the vehicle. Thereby, the outwards-facing surface of top wall and/or the surrounding panel may be of the same material, have the same colour and/or have the same surface structure as the surrounding vehicle structure.

The pivot axis may be located at or adjacent to a first end of the lid. This location of the pivot axis at an end makes it easy to rotate the lid to the open position, without the top wall dipping too deep into the lid opening.

The lid may include a locking element at or adjacent to a second end of the lid, which second end is opposite to the first end. The locking element protrudes from the one or more wall of the side wall and/or the end wall from a position below the top wall. The locking element is configured to prevent opening of the lid when in the closed position, thus locking the lid from unintentional opening, by the locking element being retained by the surrounding panel. During the displacement to the intermediate position, the locking element is displaced in relation to the surrounding panel, such that eventually the locking element goes free from the surrounding panel and thereafter the lid is free to rotate to the open position. The locking element is typically located interspaced from the top wall by a locking space.

The surrounding panel may include a flange protruding from the surrounding panel towards the lid. The flange is configured to cooperate with the locking element of the lid when in the closed position, e.g. to form an abutment for the locking element, such that the locking element can hold the lid in the closed position.

The top wall may include an overhang protruding at the second end of the lid, the overhang being configured to at least partly overlap with the flange of the surrounding panel, when the lid is in the closed position. Thereby, the locking space may be formed between the overhang and the locking element as seen in a height direction of the lid. In the closed position of the lid, the flange is located in this locking space. During the displacement to the intermediate position, the flange is moved out of this locking space, such that eventually, when reaching the intermediate position, the locking element goes free from the flange and the lid is free to rotate to the open position. Hence, the locking space typically has an extension in the height direction being somewhat larger than the thickness of the flange in the height direction, such that the flange can fit in the locking space, without the locking space being too large.

The lid opening may be larger than the top wall of the lid, such that an interspace is formed between the top wall and a side wall of the lid opening when the lid is in the closed position. The interspace may have a width, determined in a longitudinal direction of the lid, i.e. in the direction of the translational displacement, being in the range of from 1 to 20 mm, preferably from 2 to 15 mm, more preferably from 3 to 10 mm.

The surrounding panel may include an indentation. A bottom of the indentation may form a bottom wall of the interspace. The indentation is large and/or deep enough to allow the pivoting of the lid to the open position. When the lid arrangement is seen from above, the lid opening is covered by the top wall of the lid and the bottom wall of the indentation, and no through-going hole can be seen.

The one or more wall of the side wall and/or the end wall may include a stopping element configured to delimit the pivotal displacement to the open position. The stopping element is configured to cooperate with the surrounding panel, e.g. with the flange described herein, which may form an abutment for the stopping element, thereby preventing further pivotal displacement. Hence, the stopping element is typically located at a lower part of the side wall and/or the end wall, e.g. at or adjacent to a bottom of the side wall and/or the end wall.

The lid may be resiliently biased to the closed position by means of a first spring member. The first spring member may extend from the pivot axis to an attachment at the surrounding panel.

The lid may be resiliently biased to the open position by means of a second spring member. The second spring member may extend from the pivot axis to an attachment at one of the side walls of the lid, e.g. at an underside of the side wall, where the second portion is attached at its other end.

The first and second spring members may together form a single spring member, thus being a dual-functional spring member. The single spring member may include a first portion, corresponding to the first spring member mentioned above, biasing the lid to the closed position, and a second portion, corresponding to the second spring member mentioned above, biasing the lid to the open position.

The single spring member may include two first spring members and/or two second spring members, which may be located at opposite sides of the lid.

Although, it would be feasible to have a spring member only at one of the side walls, it is preferred to have a spring member at either side wall of the lid. The spring members at either side wall can be combined into a single dual-functional spring member, as mentioned above, e.g. joined at their respective first portions. It would also be feasible to separate the functions of the first portion and the second portion of the spring member as separate spring members.

The present invention also relates to a vehicle including the lid arrangement as described herein, e.g. including the one or more connectors for electronic device.

BRIEF DESCRIPTION OF THE DRAWINGS

The present invention will hereinafter be further explained by means of non-limiting examples with reference to the appended drawings wherein:

FIG. 3 is a side view of the lid in the closed position.

FIG. 4 is a cross-sectional view of the lid in the closed position.

It should be noted that the appended drawings are schematic and that individual components are not necessarily drawn to scale and that the dimensions of some features of the present invention may have been exaggerated for the sake of clarity.

DESCRIPTION OF EMBODIMENTS

The invention will, in the following, be exemplified by embodiments. It should however be realized that the embodiments are included in order to explain principles of the invention and not to limit the scope of the invention, as defined by the appended claims. A feature from one embodiment may be combined with one or more features of any other embodiment.

Figure 1:
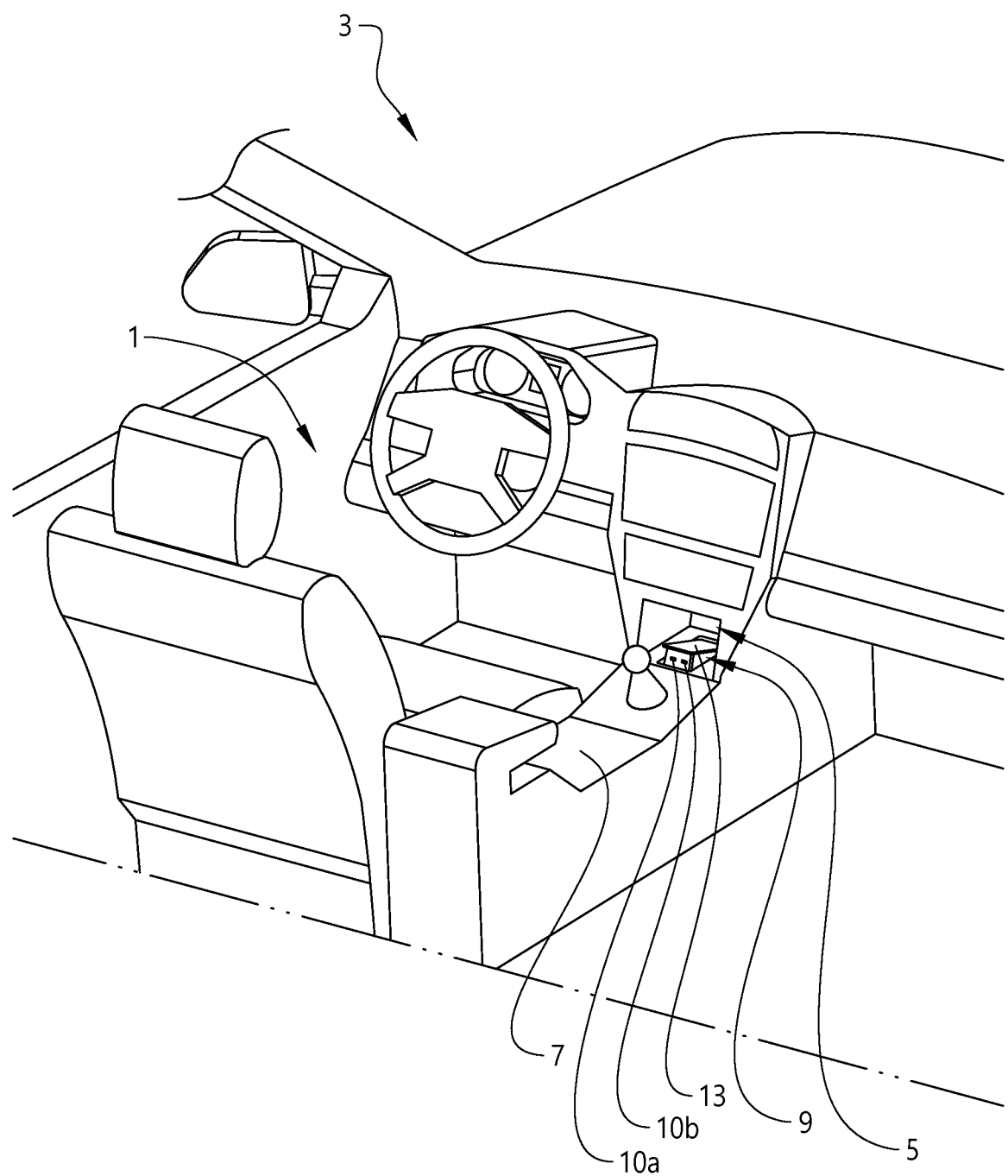
FIG. 1 is a schematic overview of a passenger compartment.

FIG. 1 is a schematic overview of a passenger compartment 1 of a vehicle 3. The passenger compartment 1 is provided with a storage compartment 5 located in a centre console 7. As an alternative or a complement, one or more storage compartments may be located in a dashboard, a door or a wall of the vehicle 3. The storage compartment/s may be used to store various items belonging to the vehicle 3 or to the users of the vehicle. The storage compartments may e.g. be used to store a portable electronic device, such as a mobile phone, a smartphone, a computer tablet or a portable computer.

Sometimes, it is desirable to be able to connect the electronic device to the vehicle 3, e.g. in order to load a battery of the electronic device and/or to connect the electronic device to an infotainment system or another system of the vehicle 3 by means of a connector, e.g. a USB connector. In the illustrated embodiment, connectors 10a, 10b are provided in a lid arrangement 9 according to the invention, which includes an openable lid 13 shown in an open position in FIG. 1, giving access to the connectors 10a, 10b.

Figure 2:
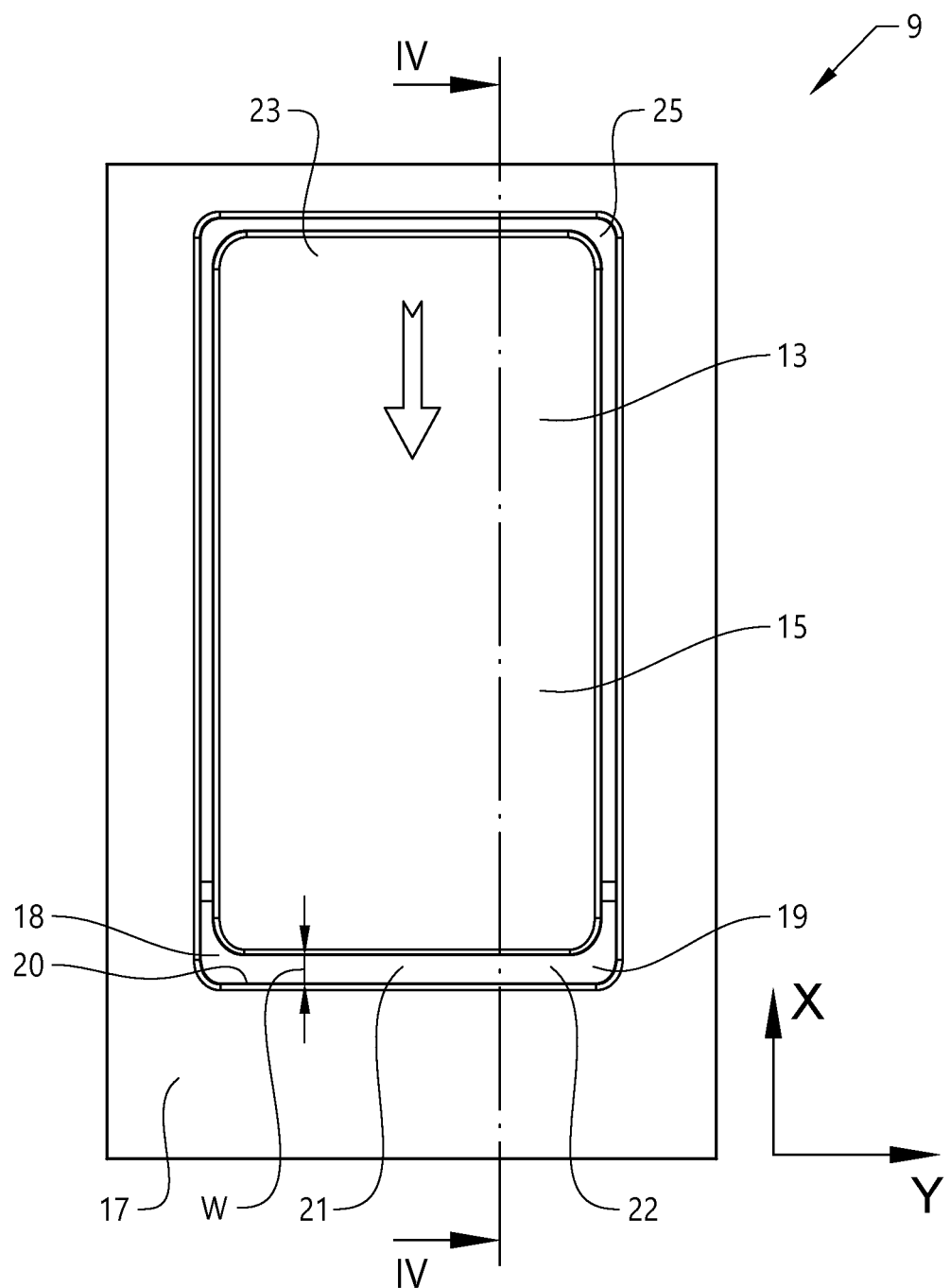
FIG. 2 is a top view of a lid arrangement according to the invention with a lid in a closed position.
Figure 5:
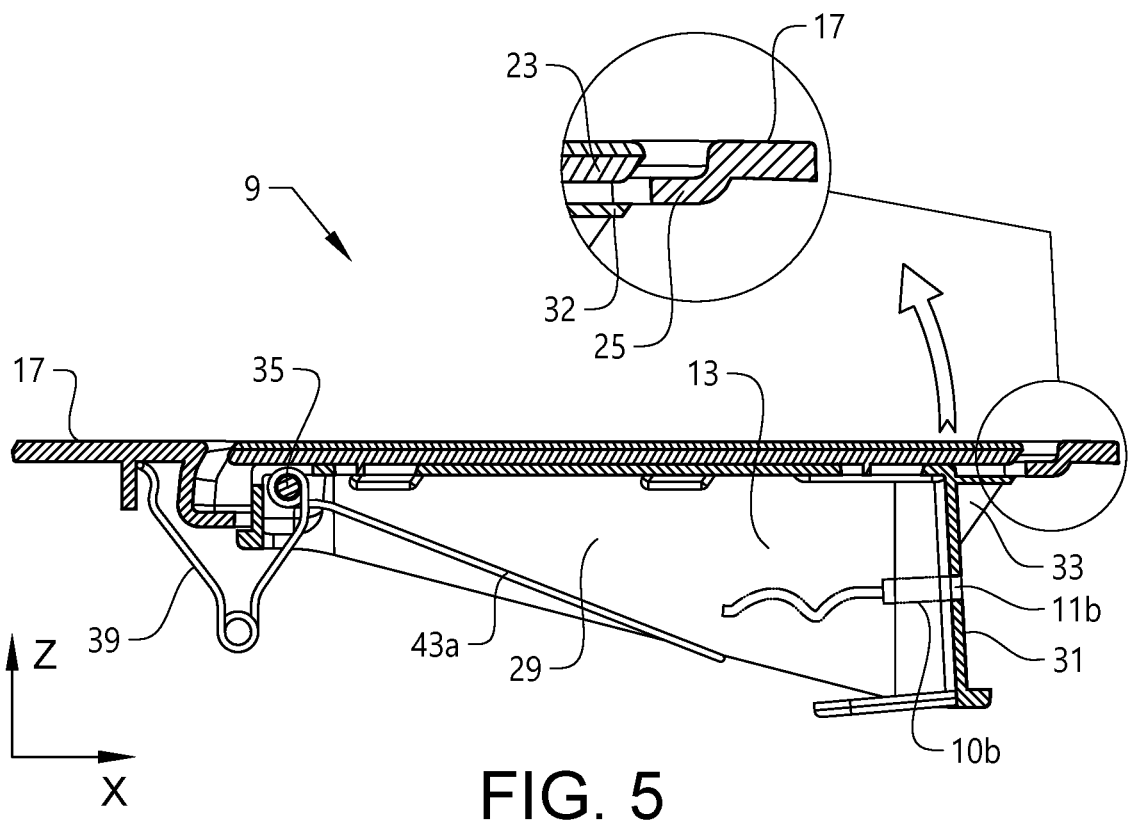
FIG. 5 is a cross-sectional view of the lid in an intermediate position.
Figure 6:
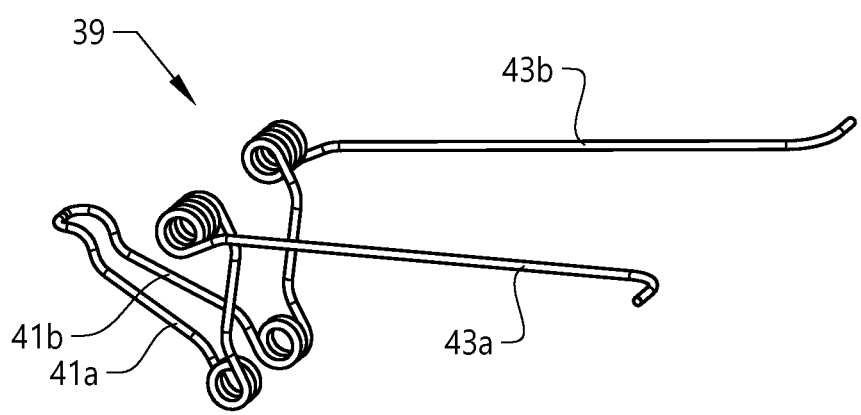
FIG. 6 is a schematic view of a spring member of the lid arrangement.
Figure 7:
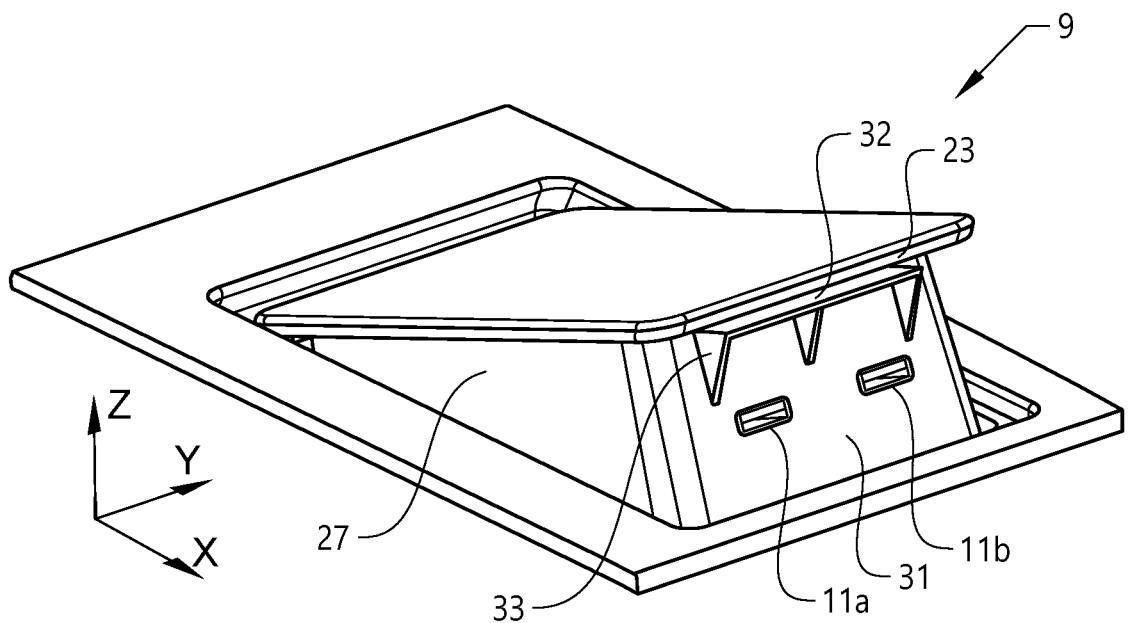
FIG. 7 is a perspective view of the lid in an open position.
Figure 8:
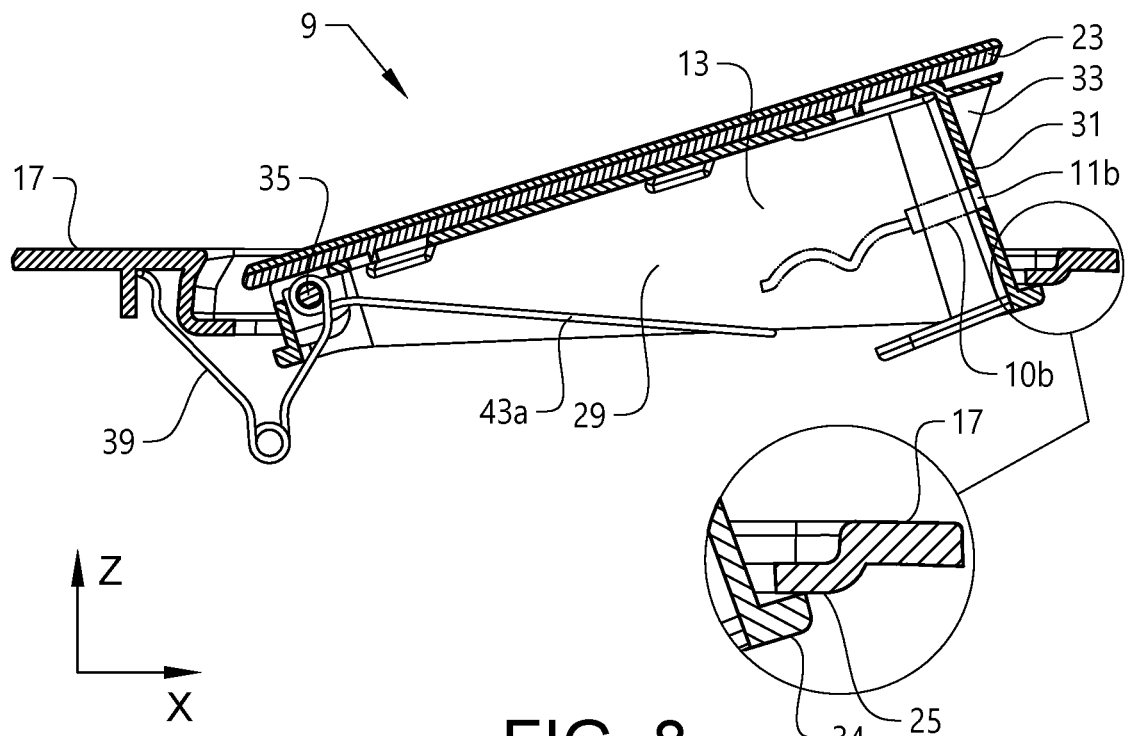
FIG. 8 is a cross-sectional view of the lid in the open position.

FIGS. 2-8 schematically show various details of the lid arrangement 9. FIG. 2 is a view from above of the lid arrangement 9 with the lid 13 in a closed position. FIG. 3 is a view from the side with the lid 13 in the closed position. FIG. 4 is a cross-sectional view with the lid 13 in the closed position, which cross-section is indicated as IV-IV in FIG. 2. FIG. 5 is a cross-sectional view with the lid 13 in an intermediate position. FIG. 6 illustrates a spring member 39. FIG. 7 is a perspective view with the lid 13 in the open position. FIG. 8 is a cross-sectional view with the lid 13 in the open position.

When the lid 13 is closed, see FIGS. 2-4, only a top wall 15 of the lid 13 facing outwards is visible. The rest of the lid 13 is located below a surrounding panel 17. The surrounding panel 17 includes a lid opening 18, in which the lid 13 is located. In the illustrated embodiment, the top wall 15 of the lid 13 is flush with the surrounding panel 17, when the lid 13 is in the closed position. The lid 13 has a longitudinal direction x, a transverse direction y and a height direction z, which are perpendicular to each other. Hence, the top wall 15 extends in the xy-plane. In the illustrated embodiment, the directions coincide with the corresponding directions of the vehicle 3, but this depends on where in the vehicle 3, the lid arrangement is located.

The surrounding panel 17 includes an indentation 19, see FIG. 4, in which a portion of the lid 13 is located when in the closed position, making it possible for the top wall 15 of the lid 13 to be flush with the surface of the surrounding panel 17. The above-mentioned lid opening 18 is determined in a plane, which is flush with the surface of the surrounding panel 17. Hence, a bottom of the indentation 19 is located below said lid opening 18 as seen in the height direction z. An interspace 21 is formed between the top wall 15 of the lid 13 and a side wall 20 of the indentation 19. The interspace 21 has a width w determined in the longitudinal direction x, i.e. in the direction of a translational displacement described below, which typically is in the range of from 1 to 20 mm, preferably from 2 to 15 mm, more preferably from 3 to 10 mm. The width w is determined in parallel to the outwards-facing surface of the top wall 15. If the outwards-facing surface is curved, an average surface is determined.

The indentation 19 includes a bottom, which forms a bottom wall 22 under the interspace 21, such that, in the illustrated embodiment, the lid opening 18 is covered by the top wall 15 of the lid 13 and the bottom wall 22 of the indentation 19 when seen from above, and no through-going hole can be seen in the surrounding panel 17. As is further described below, the lid 13 is pushable by sliding within the indentation 19, thereby moving in the interspace 21 to the intermediate position in order to open the lid 13, as is indicated by arrows in FIGS. 2-4, which indicate the translational displacement.

Although the interspace 21 is depicted as being located next to a front end side of the lid 13, there may, as an alternative or a complement, be one or more interspaces located along one or more of the other sides of the lid 13. Further, although the lid 13 is depicted as rectangular, it may also have another geometrical shape.

The lid 13 includes an overhang 23, which protrudes to the right in FIGS. 3 and 4, corresponding to a rear direction of the vehicle 3 of FIG. 1. In the closed position, the overhang 23 partly overlaps with a flange 25 protruding from the surrounding panel 17, see detailed view of FIG. 4. Hence, when seen from above, as in FIG. 2, there is no opening between the lid 13 and the surrounding panel 17, and no through-going hole can be seen in the surrounding panel 17.

The lid 13 includes a pair of side walls 27, 29 and an end wall 31. In the illustrated embodiment, the USB connectors 10a, 10b indicated as dashed lines or dashed-dotted lines, are included in the lid 13, such that the USB connectors 10a, 10b are located at connector apertures 11a, 11b of the lid 13. The USB connectors 10a, 10b are protected by the closed lid 13, see FIGS. 2-4, when not in use, and easily accessible for use when the lid 13 is open, see FIGS. 7 and 8. The connector apertures 11a, 11b, which are best seen in the perspective view of FIG. 7, are located in the end wall 31, which in the illustrated embodiment faces rearwards, i.e. in a direction towards the user of the vehicle 3.

Below the overhang 23, a locking element 32 protrudes from the end wall 31 in a direction being parallel with the overhang 23. One or more support elements 33 extend between the locking element 32 and the end wall 31 to support the locking element 32 from below, see e.g. FIG. 7. In the closed position of the lid 13, the flange 25 of the surrounding panel 17 is located between the overhang 23 and the locking element 32, as is seen in the detailed view of FIG. 4, thereby preventing opening of the lid 13. The locking element 32 has a width v in the longitudinal direction x of the lid 13. The locking element 32 and the flange 25 overlap by a length e, which is less than the width w of the interspace 21, as seen in the longitudinal direction x of the lid 13.

At the bottom of the end wall 31, a stopping element 34 protrudes from the end wall 31. The stopping element 34 is arranged to provide an end to the displacement to the open position, which is further described below.

A pivot axis 35 is located at the other end of the lid 13, i.e. at the front end of the lid 13 in the illustrated embodiment. The pivot axis 35 extends in the transverse direction y of the lid 13. The surrounding panel 17 includes a slot 37 extending in the longitudinal direction x, in which the pivot axis 35 is received. When the lid 13 is transited to the intermediate position by means of sliding in the longitudinal direction x, the pivot axis 35 moves in the slot 37, see arrows in FIGS. 3 and 4. This displacement may be made by a hand of the user of the vehicle 3.

The slot 37 guides the displacement of the lid 13 to the intermediate position, see FIG. 5. During this displacement, the top wall 15 of the lid 13 moves in the interspace 21 within the indentation 19, such that eventually more or less of the interspace 21 is covered by the top wall 15 of the lid 13, when in the intermediate position. However, there should be enough room within the indentation 19 for the pivotal displacement of the lid 13 described below. As a result of the translational displacement of the lid 13 to the intermediate position, the locking element 32 is moved away from the flange 25 protruding from the surrounding panel 17, making the lid 13 free to move to the open position by rotating at the pivot axis 35 in the slot 37, see arrow in FIG. 5.

The slot 37 has a length l, which is determined in parallel to the outwards-facing surface of the top wall 15 in the longitudinal direction x of the lid 13, see FIG. 3. If the outer surface of the top wall 15 is curved, an average surface is determined. The length l of the slot 37 is further determined perpendicularly to the extension of the pivot axis 35, which extends in the transverse direction y of the lid 13. The width w of the interspace 21, the width v of the locking element 32, the length e of the overlap between the locking element 32 and the flange 25 and the length l of the slot 37 are thus determined in parallel to each other in the longitudinal direction x of the lid 13. The length l of the slot 37 is larger than the length e of the overlap. Further, also the width w of the interspace 21 is larger than the length e of the overlap. Hence, it is ascertained that the locking element 32 can be moved away from the flange 25 of the surrounding panel 17, making the lid 13 free to rotate to the open position.

The pivot axis may be a through-going shaft passing through the side walls 27, 29 of the lid 13, as in the illustrated embodiment. There may also be two short pivot axes, one at each side wall 27, 29. As yet an alternative embodiment, not illustrated, the pivot axis/ axes could instead be located in the surrounding panel 17 and the slot could instead be located in the side wall 27, 29 of the lid 13.

In the open position of the lid 13, illustrated in FIGS. 7 and 8, the USB connectors 10a, 10b are easily accessible through the connector apertures 11a, 11b. However, in the closed position of the lid 13, as in FIGS. 2-4, the connector apertures 11a, 11b and hence the USB connectors 10a, 10b are protected from dirt and/or moisture by the lid 13.

The lid 13 is provided with a dual-functional spring member 39 including two first portions 41a, 41b and two second portions 43a, 43b, see FIG. 6. The first portions 41a, 41b of the spring member 39, bias the lid 13 to the closed position, see FIGS. 3 and 4. The first portions 41a, 41b of the spring member 39 are pretensioned between the pivot axis 35 and an attachment 45 at the surrounding panel 17 outside of the lid opening 18. In the illustrated embodiment, there is one first portion 41a, 41b located at each side wall 27, 29.

The second portions 43a, 43b of the spring member 39 extend from the pivot axis 35 to an underside of a respective the side wall 27, 29, where the second portions 43a, 43b are attached at their other ends. The second portions 43a, 43b are pretensioned to push the lid 13 upwards. However, as long as the lid 13 is in the closed position, the upward movement is prevented by the locking element 32 being stopped by the flange 25 of the surrounding panel 17, see FIG. 4. When the lid 13 is slid to the intermediate position, e.g. by the user pushing it, the locking element 32 moves out from the flange 25 and the lid 13 will be free to move upwards by the force of the second portions 43a, 43b of the spring member 39, see FIG. 5.

Although it would be feasible to have a spring member only at one of the side walls 27, 29, it is preferred to have a spring member at either side wall 27, 29 of the lid 13, as in the illustrated embodiment. The spring members at either side wall 27, 29 can be combined into a single spring member 39, as is illustrated, e.g. joined at their respective first portions 41*a*, 41*b*. It would also be feasible to separate the functions of the first portion and the second portion of the spring member as separate spring members.

During the opening displacement of the lid 13, the second portions 43*a*, 43*b* of the spring member 39 push the lid 13 to rotate upwards around the pivot axis 35. The end of the opening displacement is reached when the stopping element 34 reaches the flange 25 of the surrounding panel 17, see detailed view of FIG. 8. When the lid 13 is displaced to its open position, the pivot axis 35 is moved back in the slot 37 to its original position, i.e. the position of the pivot axis 35 when the lid 13 is in the closed position by means of the force from the first portions 41*a*, 41*b* of the spring member 39.

When the lid 13 is to be closed again, the user of the vehicle 3 applies pressure to the lid 13 to counteract the force of the spring member 39. Thereby the user pushes the lid 13 downwards at the same time as the pivot axis 35 first rotates and then moves translationally in the longitudinal direction x in the slot 37. Thereby the locking element 32 can pass downwards in relation to the flange 25, cf. the intermediate position illustrated in FIG. 5, until the lid 13 finally reaches the closed position, illustrated in FIGS. 2-4, in which the first portions 41*a*, 41*b* of the spring member 39 holds the lid 13 closed.

The biasing of the lid 13, in the direction of the slot 37 and/or to the open position, respectively, may also be performed by another means than the illustrated spring member 39, e.g. another kind of spring member, an electromechanical means or an electrical means, such as a small motor.

Further modifications of the invention within the scope of the appended claims are feasible. As such, the present invention should not be considered as limited by the embodiments and figures described herein. Rather, the full scope of the invention should be determined by the appended claims, with reference to the description and drawings.

The invention claimed is:

1. A lid arrangement comprising a lid and a surrounding panel, said surrounding panel comprising a lid opening, in which said lid is located, said lid comprising:
   a top wall facing outwards,
   one or more wall of a side wall and an end wall,
   said lid being transitable from a closed position to an open position,
   said top wall of said lid in said closed position being configured to at least partly cover said lid opening,
   said lid in said open position allowing access to said one or more wall of said side wall and said end wall,
   wherein said lid is transitable from said closed position to said open position via an intermediate position,
   wherein one of said lid and said surrounding panel comprises a pivot axis and the other of said lid and said surrounding panel comprises a slot configured to receive said pivot axis, wherein said slot is configured for linear translational displacement of said pivot axis within said slot along a common plane of said lid and said surrounding panel, allowing said lid to transit from said closed position to said intermediate position,
   wherein said slot is also configured for pivotal displacement of said pivot axis within said slot, allowing said lid to transit from said intermediate position to said open position; and
   wherein said surrounding panel comprises a flange protruding from said surrounding panel towards said lid.

2. The lid arrangement according to claim 1, wherein said one or more wall of said side wall and said end wall comprises a connector aperture configured for a connector of an electronic device, said connector being at least partly located inside said lid.

3. The lid arrangement according to claim 2, wherein said lid arrangement further comprises said connector of said electronic device, said connector at least partly being located inside said lid.

4. The lid arrangement according to claim 1, wherein said top wall or said surrounding panel is configured to form a surface part of a vehicle structure, such as a surface part of a storage compartment, a centre console, a dashboard, a door, a ceiling or a compartment wall of a vehicle.

5. The lid arrangement according to claim 1, wherein said pivot axis is located at or adjacent to a first end of said lid.

6. The lid arrangement according to claim 1, wherein said lid comprises a locking element at or adjacent to a second end of said lid, said locking element protruding from said one or more wall of said side wall or said end wall from a position below said top wall.

7. The lid arrangement according to claim 1, wherein said top wall comprises an overhang protruding at said second end of said lid, said overhang being configured to at least partly overlap with said flange of said surrounding panel, when said lid is in said closed position.

8. The lid arrangement according to claim 1, wherein said lid opening is larger than said top wall of said lid, such that an interspace is formed between said top wall and a side wall of said lid opening when said lid is in said closed position.

9. The lid arrangement according to claim 8, wherein said surrounding panel comprises an indentation, said indentation forming a bottom wall of said interspace.

10. The lid arrangement according to claim 1, wherein said one or more wall of said side wall and said end wall comprises a stopping element configured to delimit said pivotal displacement to said open position.

11. The lid arrangement according to claim 1, wherein said lid is resiliently biased to said closed position by means of a first spring member.

12. The lid arrangement according to claim 1, wherein said lid is resiliently biased to said open position by means of a second spring member.

13. The lid arrangement according to claim 11, wherein said first spring member and second spring member together form a single spring member.

14. The lid arrangement according to claim 13, wherein said single spring member comprises two first spring members and two second spring members.

* * * * *